United States Patent
Sato et al.

(10) Patent No.: US 11,003,911 B2
(45) Date of Patent: May 11, 2021

(54) INSPECTION ASSISTANCE DEVICE, INSPECTION ASSISTANCE METHOD, AND RECORDING MEDIUM

(71) Applicant: NEC Corporation, Tokyo (JP)

(72) Inventors: Takami Sato, Tokyo (JP); Kota Iwamoto, Tokyo (JP); Yoshinori Saida, Tokyo (JP); Shin Norieda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/489,057

(22) PCT Filed: Feb. 28, 2017

(86) PCT No.: PCT/JP2017/007759
§ 371 (c)(1),
(2) Date: Aug. 27, 2019

(87) PCT Pub. No.: WO2018/158814
PCT Pub. Date: Sep. 7, 2018

(65) Prior Publication Data
US 2020/0065585 A1 Feb. 27, 2020

(51) Int. Cl.
*G06K 9/00* (2006.01)
*G06T 7/00* (2017.01)

(52) U.S. Cl.
CPC ........ *G06K 9/00671* (2013.01); *G06T 7/0004* (2013.01)

(58) Field of Classification Search
None
See application file for complete search history.

(56) References Cited

U.S. PATENT DOCUMENTS

2004/0008889 A1* 1/2004 Ikeda ............... G06K 9/6821
382/182
2005/0273720 A1* 12/2005 Cochran .......... G05B 19/41875
715/751
(Continued)

FOREIGN PATENT DOCUMENTS

JP H08-96083 A 4/1996
JP 09-167192 A 6/1997
(Continued)

OTHER PUBLICATIONS

International Search Report of PCT/JP2017/007759 dated May 23, 2017.
(Continued)

*Primary Examiner* — Jwalant Amin

(57) ABSTRACT

Provided is a an inspection assistance device. This inspection assistance device is provided with: an image data acquisition unit that acquires image data in which a to-be-inspected object is captured; a display control unit that causes a display unit to display information about inspection results of the to-be-inspected object, recognized on the basis of the acquired image data, in such a manner as to be superimposed on an image that includes the to-be-inspected object; and a recording control unit that records the information being displayed on the display unit and the information about the to-be-inspected object in association with each other.

11 Claims, 12 Drawing Sheets

(56) References Cited

U.S. PATENT DOCUMENTS

| | | | | |
|---|---|---|---|---|
| 2010/0306117 A1* | 12/2010 | Terayoko | ............... | G06Q 10/00 |
| | | | | 705/313 |
| 2011/0222647 A1* | 9/2011 | Sugita | .................. | G01N 23/046 |
| | | | | 378/8 |
| 2015/0363076 A1 | 12/2015 | Komatsu | | |
| 2017/0332062 A1* | 11/2017 | Chang | ................... | G01J 5/0265 |
| 2019/0170665 A1* | 6/2019 | Kaneko | ............. | G01N 21/8851 |
| 2019/0347783 A1* | 11/2019 | Salgian | ................ | G02B 27/017 |

FOREIGN PATENT DOCUMENTS

| | | | | |
|---|---|---|---|---|
| JP | 2003-177775 A | | 6/2003 | |
| JP | 2007-018188 A | | 1/2007 | |
| JP | 2014-002430 A | | 1/2014 | |
| JP | 2014002430 A | * | 1/2014 | |
| JP | 2014-235704 A | | 12/2014 | |
| JP | 2016-004292 A | | 1/2016 | |
| WO | 2012/046726 A1 | | 4/2012 | |
| WO | WO-2012046726 A1 | * | 4/2012 | ......... G05B 23/0216 |
| WO | 2017/014288 A1 | | 1/2017 | |

OTHER PUBLICATIONS

Written Opinion of the International Searching Authority of PCT/JP2017/007759 dated May 23, 2017.
Japanese Office Action for JP Application No. 2019-502317 dated Dec. 15, 2020 with English Translation.

* cited by examiner

| MEASURED VALUE | INSPECTION TARGET NAME | INSPECTION ITEM |
|---|---|---|
| 7°C | THERMOMETER 31 | MEASURE TEMPERATURE |
| 5°C | THERMOMETER 32 | MEASURE TEMPERATURE |
| ... | ... | ... |

Fig.15

| INSPECTION TARGET POSITION | INSPECTION TARGET NAME | INSPECTION ITEM |
|---|---|---|
| (LATITUDE xx1, LONGITUDE yy1) | THERMOMETER 31 | MEASURE TEMPERATURE |
| (LATITUDE xx2, LONGITUDE yy2) | THERMOMETER 32 | MEASURE TEMPERATURE |
| ... | ... | ... |

Fig.16

| INSPECTION TIME | INSPECTION TARGET NAME | INSPECTION ITEM |
|---|---|---|
| hh:mm:ss | THERMOMETER 31 | MEASURE TEMPERATURE |
| hh:mm:ss | THERMOMETER 32 | MEASURE TEMPERATURE |
| ... | ... | ... |

INSPECTION ASSISTANCE DEVICE, INSPECTION ASSISTANCE METHOD, AND RECORDING MEDIUM

CROSS REFERENCE TO RELATED APPLICATIONS

This application is a National Stage of International Application No. PCT/JP2017/007759 filed Feb. 28, 2017.

TECHNICAL FIELD

The present disclosure relates to an inspection assistance device, an inspection assistance method, and a recording medium.

BACKGROUND ART

Methods of assisting inspection work on equipment such as a measuring instrument are disclosed. For example, PTL 1 describes an inspection assistance device recognizing identification information and a measured value of a measuring instrument, based on image information of the measuring instrument captured by a camera, and storing the measured value into a storage unit in association with the identification information of the measuring instrument.

Further, PTL 2 describes a substrate production assistance system displaying, when a plurality of recognition targets exist in a visual field of a worker, production information indicating availability or the like of the plurality of recognition targets in association with identification markers in the visual field of the worker on a one-to-one basis in the proximity of the identification marker.

Further, PTL 3 describes an information presentation system reading identification information uniquely identifying a light emitting type radio frequency identifier (RFID) tag attached to equipment to be maintained and displaying display information related to the equipment to be maintained at a position calculated based on a light emitting position of the RFID tag.

Moreover, PTL 4 describes an example of a device using voice, and PTL 5 describes an example of a method of simplifying data input on a mobile terminal.

CITATION LIST

Patent Literature

PTL 1: International Application Publication No. WO 2012/046726
PTL 2: Japanese Unexamined Patent Application Publication No. 2014-235704
PTL 3: Japanese Unexamined Patent Application Publication No. 2007-018188
PTL 4: Japanese Unexamined Patent Application Publication No. 2003-177775
PTL 5: Japanese Unexamined Patent Application Publication No. H9-167192

SUMMARY OF INVENTION

Technical Problem

In the technology described in PTL 1, identification information and a measured value of a measuring instrument are recognized and the recognition result is stored in the storage unit. In order to grasp a recognition result with respect to a measured value during an inspection, a worker needs to check the result with a processing terminal on hand. However, in such a case, the worker needs to move his/her line of sight from the measuring instrument to the processing terminal, and thus working efficiency may be degraded.

Further, the technologies described in PTLs 2 and 3 display information about identified equipment being stored in a storage unit or the like by reading an identification marker or an RFID tag. Accordingly, in the technologies described in PTLs 2 and 3, a worker cannot grasp, while working, information related to a result of an inspection performed on the equipment at the time of reading the identification marker or the RFID tag.

The present disclosure has been made in view of the aforementioned problems, and an object of the present disclosure is to provide a technology of enhancing efficiency of inspection work.

Solution to Problem

An inspection assistance device according to an aspect of the present disclosure includes an image data acquisition means configured to acquire image data in which an inspection target is captured, a display control means configured to superimpose information about an inspection result of the inspection target on an image including the inspection target, the information being recognized based on the acquired image data, and cause a display unit to display the resulting image, and a recording control means configured to record the information displayed on the display unit and information about the inspection target in association with each other.

Further, an inspection assistance method according to an aspect of the present disclosure includes acquiring image data in which an inspection target is captured, superimposing information about an inspection result of the inspection target on an image including the inspection target, the information being recognized based on the acquired image data, and causing a display unit to display the resulting image, and recording the displayed information and information about the inspection target in association with each other.

A computer program providing the aforementioned device or method by a computer and a computer-readable non-transitory recording medium storing the computer program also fall under the category of the present disclosure.

Advantageous Effects of Invention

The present disclosure can enhance efficiency of inspection work.

BRIEF DESCRIPTION OF DRAWINGS

FIG. 15 is a diagram illustrating an example of inspection target information recorded in an inspection target information recording unit.

FIG. 16 is a diagram illustrating another example of inspection target information recorded in the inspection target information recording unit.

EXAMPLE EMBODIMENT

First Example Embodiment

Figure 1:
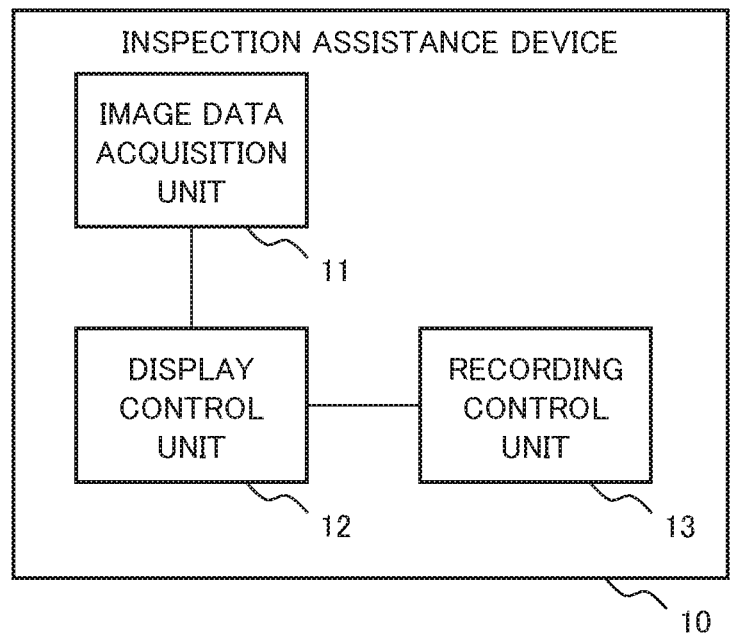
FIG. 1 is a functional block diagram illustrating an example of a functional configuration of an inspection assistance device according to a first example embodiment.
Figure 2:
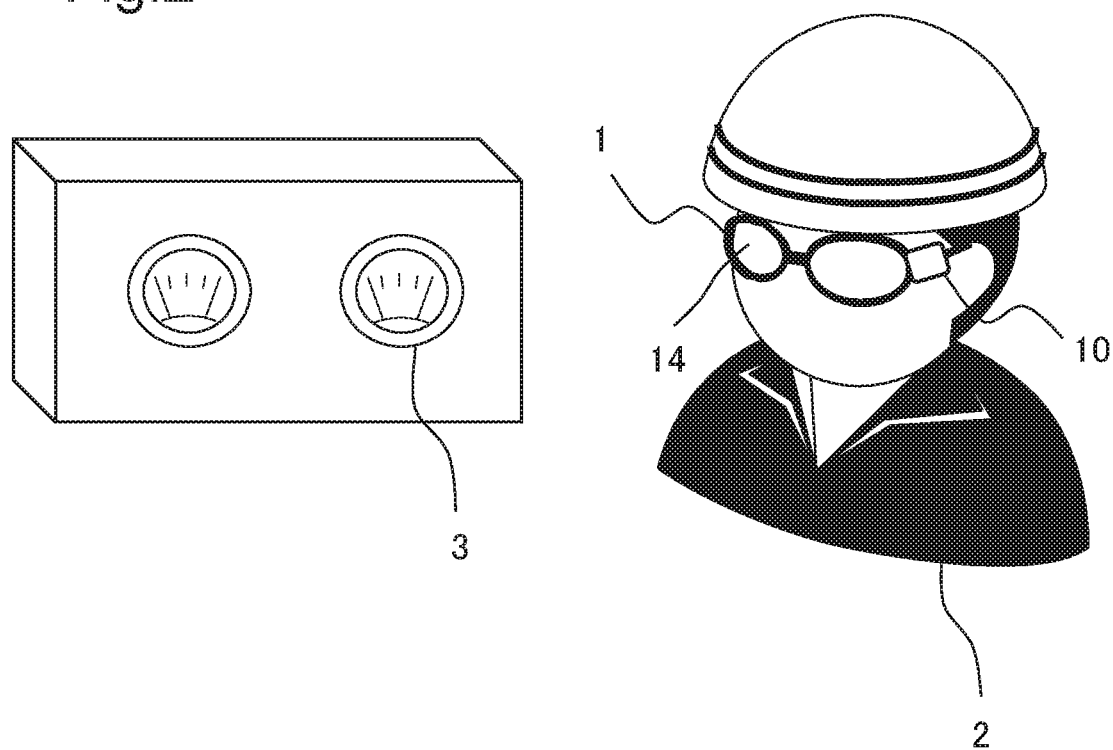
FIG. 2 is a diagram illustrating an example of an application of the inspection assistance device illustrated in FIG. 1.

A first example embodiment of the present disclosure will be described with reference to drawings. FIG. 1 is a functional block diagram illustrating an example of a functional configuration of an inspection assistance device 10 according to the present example embodiment. FIG. 2 is a diagram illustrating an example of an application of the inspection assistance device 10 illustrated in FIG. 1. For example, the inspection assistance device 10 is equipped on a glasses type wearable terminal as illustrated in FIG. 2. The glasses type wearable terminal is hereinafter referred to as wearable glasses 1. For example, by a worker 2 wearing the wearable glasses 1 turning his/her face in a direction of an inspection target 3 such as a measuring instrument, the wearable glasses 1 image the inspection target 3. The captured image is displayed on a display unit 14 on the wearable glasses 1. Consequently, the worker 2 checks the image in which the inspection target 3 is captured, through the wearable glasses 1.

The inspection assistance device 10 according to the present example embodiment includes an image data acquisition unit 11, a display control unit 12, and a recording control unit 13, as illustrated in FIG. 1.

The image data acquisition unit 11 acquires image data in which an inspection target 3 is captured. For example, the image data acquisition unit 11 acquires image data representing an image captured by a camera including a lens and an imaging element. The captured image includes the inspection target 3. The image data acquisition unit 11 may be a camera itself, or may acquire image data acquired by a camera from the camera. The image data acquisition unit 11 may acquire image data acquired by a camera from a recording unit recording the image data. The image data acquisition unit 11 provides the acquired image data for the display control unit 12.

The display control unit 12 superimposes information about an inspection result of an inspection target 3 on an image including the inspection target 3, the information being recognized based on image data acquired by the image data acquisition unit 11, and causes the display unit 14 to display the resulting image. The display control unit 12 receives image data from the image data acquisition unit 11 and identifies an inspection target 3 included in an image represented by the received image data. The display control unit 12 recognizes information about an inspection result related to the identified inspection target 3. For example, when the inspection target 3 is a thermometer, the display control unit 12 may set temperature as information about an inspection result. Further, for example, when the inspection target 3 is a thermometer, the display control unit 12 may set information indicating whether or not temperature is within a predetermined range as information about an inspection result. The display control unit 12 superimposes the recognized information about the inspection result on the image including the inspection target 3 and being represented by the image data, and causes the display unit 14 to display the resulting image.

For example, the display unit 14 is a lens part of the wearable glasses 1 as illustrated in FIG. 2, and for example, is provided by a display module transmitting external light and displaying information in accordance with an instruction from the display control unit 12; however, the display unit 14 is not limited to the above. The display unit 14 may be a module having a function of displaying, on a retina of the worker 2, an image being generated by the display control unit 12 and including an inspection target 3, information about an inspection result being superimposed on the image. Thus, the display unit 14 may have a function of projecting an image generated by the display control unit 12, in accordance with control by the display control unit 12. The display control unit 12 may have the function of projecting an image generated by the display control unit 12. For example, when the display unit 14 is set to be a retina, the display control unit 12 may have a function of superimposing recognized information about an inspection result on an image including an inspection target 3 and directly projecting the resulting image on the retina.

The recording control unit 13 records information about an inspection result, the information being displayed on the display unit 14, and information about an inspection target 3 in association with one another. The recording control unit 13 records information about an inspection result and information about an inspection target 3 being associated with one another into, for example, a recording medium such as a hard disk drive or paper. For example, information about an inspection target 3 includes an inspection item for the inspection target 3, a normal value of the inspection target 3, and information indicating a state of the inspection target 3 in a normal condition but is not limited to the above.

Figure 3:
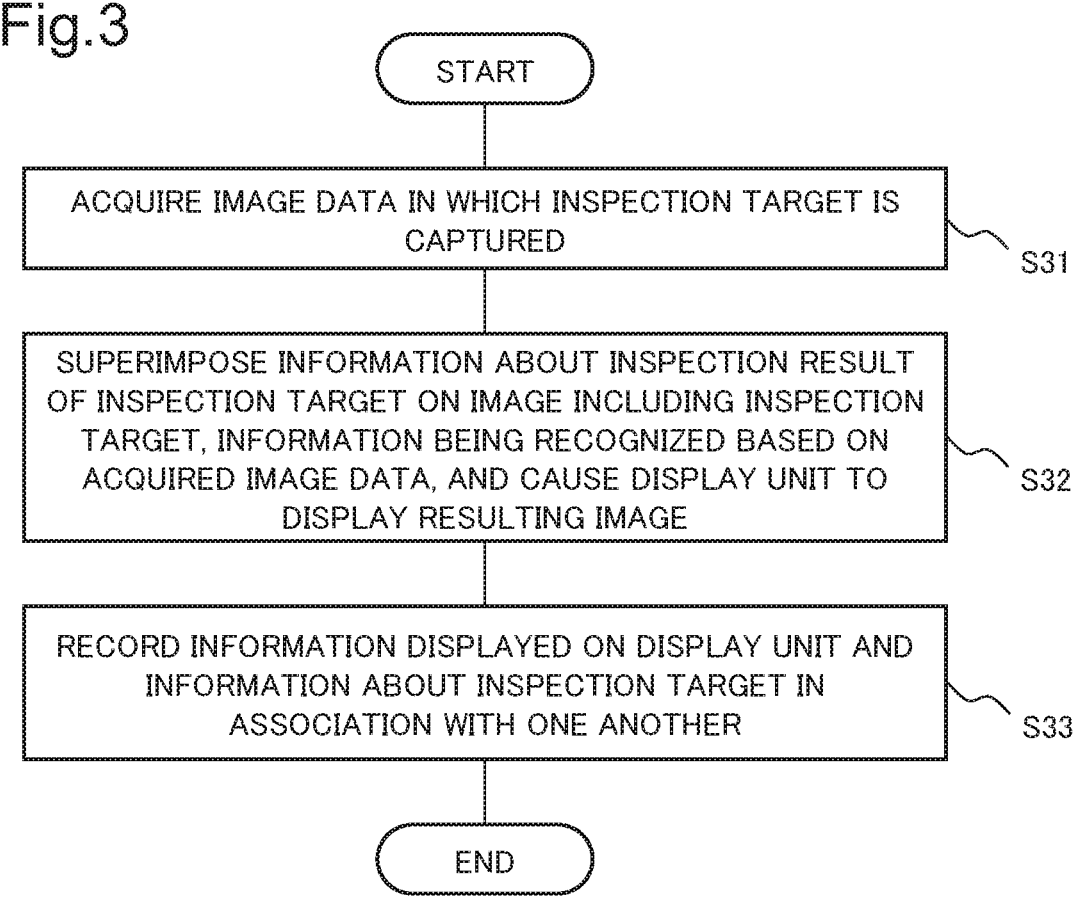
FIG. 3 is a flowchart illustrating an example of a processing flow in the inspection assistance device according to the first example embodiment.

FIG. 3 is a flowchart illustrating an example of a processing flow in the inspection assistance device 10 according to the present example embodiment. As described in FIG. 3, the image data acquisition unit 11 acquires image data in which an inspection target 3 is captured (Step S31). Then, the display control unit 12 superimposes information about an inspection result of the inspection target 3 on an image including the inspection target 3, the information being recognized based on the acquired image data, and causes the display unit 14 to display the resulting image (Step S32). Then, the recording control unit 13 records the information displayed on the display unit 14 and the information about the inspection target 3 in association with one another (Step S33).

Thus, the inspection assistance device 10 according to the present example embodiment can superimpose information about an inspection result on an image represented by image data in which an inspection target 3 is captured, the information being recognized based on the image data, and display the resulting image on the display unit 14 on the wearable glasses 1. Since the image represented by the image data includes the inspection target 3, the worker 2 wearing the wearable glasses 1 can grasp the inspection target 3 and the information about the inspection result of the inspection target 3. For example, when information about an inspection result is a measured value of a measuring instrument, the worker 2 can readily grasp that a measured value displayed on the display unit 14 is a measured value of an inspection target 3.

Further, the inspection assistance device 10 records information about an inspection result, the information being displayed on the display unit 14, and information about an inspection target in association with one another. For example, when information about an inspection target is an inspection item, the inspection assistance device 10 records an inspection item and information about an inspection result in association with one another. Consequently, for example, time and effort for manually inputting information about an inspection result by use of a terminal or the like by the worker 2 can be saved. Further, human errors due to manual input can be reduced.

Further, by referring to recorded information, a worker checking an inspection result can readily grasp an inspection item and information about an inspection result. As described above, the inspection assistance device 10 according to the present example embodiment can enhance efficiency of inspection work.

Second Example Embodiment

Figure 4:
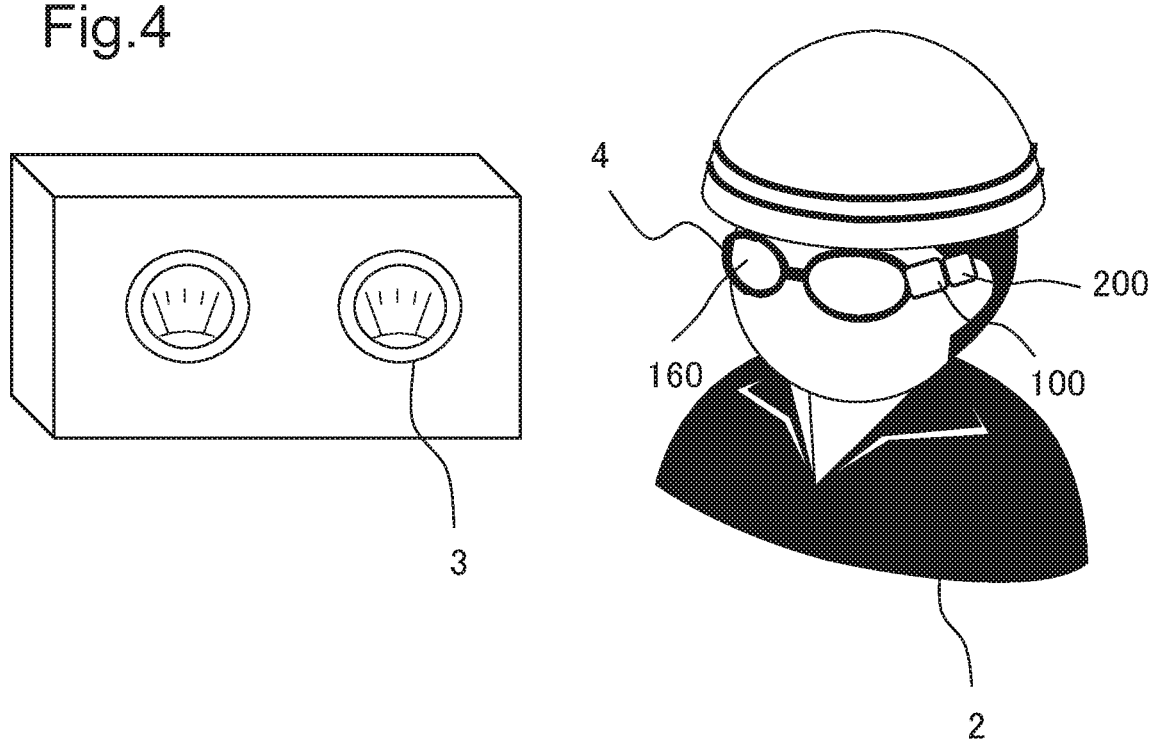
FIG. 4 is a diagram for illustrating wearable glasses including an inspection assistance device according to a second example embodiment.

Next, a second example embodiment of the present disclosure based on the aforementioned first example embodiment will be described with reference to drawings. FIG. 4 is a diagram for illustrating wearable glasses 4 including an inspection assistance device 100 according to the present example embodiment. As illustrated in FIG. 4, for example, the inspection assistance device 100 is equipped on the wearable glasses 4. For example, by a worker 2 wearing the wearable glasses 4 turning his/her face toward an inspection target 3 such as a measuring instrument, the wearable glasses 4 image the inspection target 3. The captured image is displayed on a display unit 160 on the wearable glasses 4. Consequently, the worker 2 checks an image in which the inspection target 3 is captured, through the wearable glasses 4. Further, the wearable glasses 4 may include an input device 200. The input device 200 will be described later.

Figure 5:
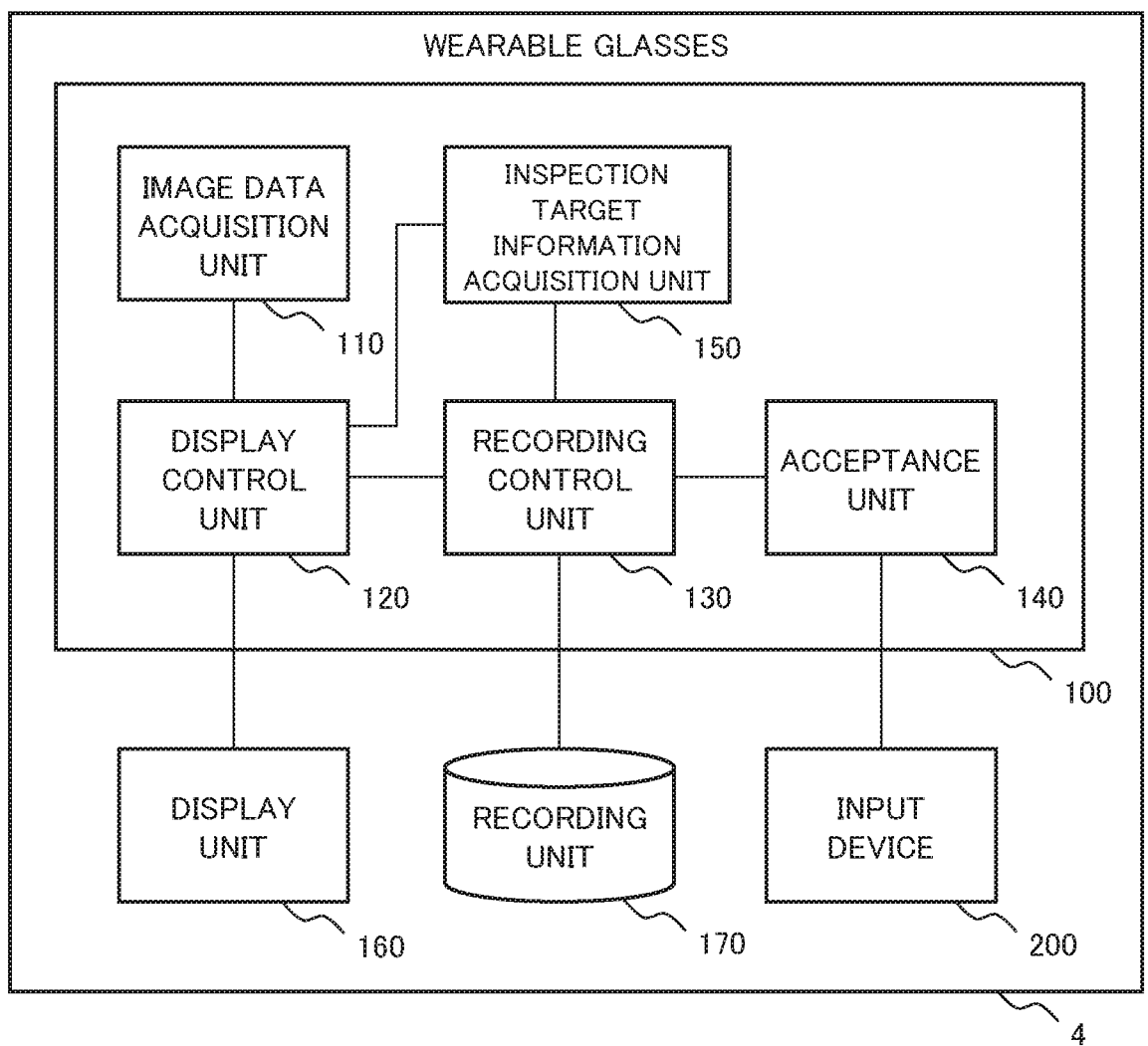
FIG. 5 is a block diagram illustrating a configuration example of the wearable glasses including the inspection assistance device according to the second example embodiment.

FIG. 5 is a block diagram illustrating a configuration example of the wearable glasses 4 including the inspection assistance device 100 according to the present example embodiment. As illustrated in FIG. 5, the wearable glasses 4 include the inspection assistance device 100, the input device 200, the display unit 160, and a recording unit 170.

The inspection assistance device 100 may be configured to include the input device 200, the display unit 160, and the recording unit 170.

The inspection assistance device 100 is an example of the inspection assistance device 10 according to the first example embodiment. As illustrated in FIG. 5, the inspection assistance device 100 includes an image data acquisition unit 110, a display control unit 120, a recording control unit 130, an acceptance unit 140, and an inspection target information acquisition unit 150.

The image data acquisition unit 110 is an example of the image data acquisition unit 11 according to the first example embodiment. The image data acquisition unit 110 acquires image data in which an inspection target 3 is captured. For example, the image data acquisition unit 110 acquires image data representing an image captured by a camera including a lens and an imaging element. The captured image includes the inspection target 3. The image data acquisition unit 110 may be a camera itself, or may acquire image data acquired by a camera from the camera. The image data acquisition unit 110 may acquire image data acquired by a camera from the recording unit recording the image data. The image data acquisition unit 110 provides the acquired image data for the display control unit 120.

The display control unit 120 is an example of the display control unit 12 according to the first example embodiment. The display control unit 120 superimposes information about an inspection result of an inspection target 3 on an image including the inspection target 3, the information being recognized based on image data acquired by the image data acquisition unit 110, and causes the display unit 160 to display the resulting image. The display control unit 120 receives image data from the image data acquisition unit 110 and identifies an inspection target 3 included in an image represented by the received image data. A method of identifying an inspection target 3 by the display control unit 120 is not particularly limited, and any method may be employed. For example, by comparison between image data acquired by the image data acquisition unit 110 and image data for identifying an inspection target 3, the display control unit 120 may identify what the inspection target 3 included in the image data represents.

Then, the display control unit 120 recognizes information about an inspection result related to the identified inspection target 3. A method of recognizing information about an inspection result by the display control unit 120 is not particularly limited, and any method may be employed. For example, when an inspection target 3 is a measuring instrument such as a thermometer, the display control unit 120 may read temperature indicated by the thermometer into a memory and recognize the reading result as information about an inspection result. Further, when an inspection target 3 is a structure, the display control unit 120 may calculate a degree of degradation of the structure by calculating the degree from changes in color and texture, and recognize the calculation result as information about an inspection result. A calculation method of a degree of degradation may employ any method, and for example, a variation in color may be set as a degree of degradation.

The display control unit 120 superimposes the recognized information about the inspection result on an image including the inspection target 3, the image being represented by the image data, and causes the display unit 160 to display the resulting image. An example of information displayed by the display unit 160 will be described in a separate drawing. The display unit 160 may be a lens part of the wearable glasses 4, similarly to the aforementioned display unit 14.

For example, the input device 200 is a device for inputting an instruction by the worker 2. For example, the input device 200 may be provided by a switch being equipped on the wearable glasses 4 and being depressible by the worker 2, or the like. Further, the input device 200 may be a terminal being separate from the wearable glasses 4 and being capable of communicating with the wearable glasses 4. Further, for example, the input device 200 may be an infrared sensor capable of detecting an operation by the worker 2, or the like.

The acceptance unit 140 accepts an instruction (recording instruction) input by the worker 2 by use of the input device 200. The acceptance unit 140 provides the accepted recording instruction for the recording control unit 130.

The inspection target information acquisition unit 150 acquires information about an inspection target 3. For example, information about an inspection target 3 includes an identifier for identifying the inspection target 3, an inspection target name representing the inspection target 3, and an inspection item for the inspection target 3. The inspection target information acquisition unit 150 acquires information about an inspection target 3, based on image data acquired by the image data acquisition unit 110. The inspection target information acquisition unit 150 may receive image data acquired by the image data acquisition unit 110 through the display control unit 120, recognize an inspection target 3 by comparing the inspection target 3 included in the image data with, for example, a dictionary, and acquire information about the inspection target 3 associated with the recognized inspection target 3. Further, the inspection target information acquisition unit 150 may receive information indicating an inspection target 3 identified by the display control unit 120 from the display control unit 120, and from the information, acquire information about the inspection target 3. Information about an inspection target 3 may be acquired from image data themselves or may be acquired from the recording unit storing information about the inspection target.

The recording control unit 130 is an example of the recording control unit 13 according to the first example embodiment. The recording control unit 130 records information about an inspection result, the information being displayed on the display unit 160, and information about an inspection target in association with one another. The recording control unit 130 receives information about an inspection target from the inspection target information acquisition unit 150 and records information about an inspection result, the information being displayed on the display unit 160 by the display control unit 120, and the information about the inspection target in association with one another. While it is assumed that the recording control unit 130 according to the present example embodiment records the associated information in the recording unit 170, the recording control unit 130 may be configured to record the associated information by outputting the information to paper or another medium. It is preferable that the recording control unit 130 record information about an inspection result and information about an inspection target when the acceptance unit 140 accepts a recording instruction. Consequently, only information with respect to which a recording instruction is given by the worker 2 is recorded, and information determined not necessary to be recorded is not recorded. Accordingly, information necessary in inspection work is recorded, and therefore management efficiency of recorded information can be enhanced.

For example, the recording unit 170 is provided by a hard disk drive. The recording unit 170 records information about an inspection result and information about an inspection target associated by the recording control unit 130.

Figure 6:
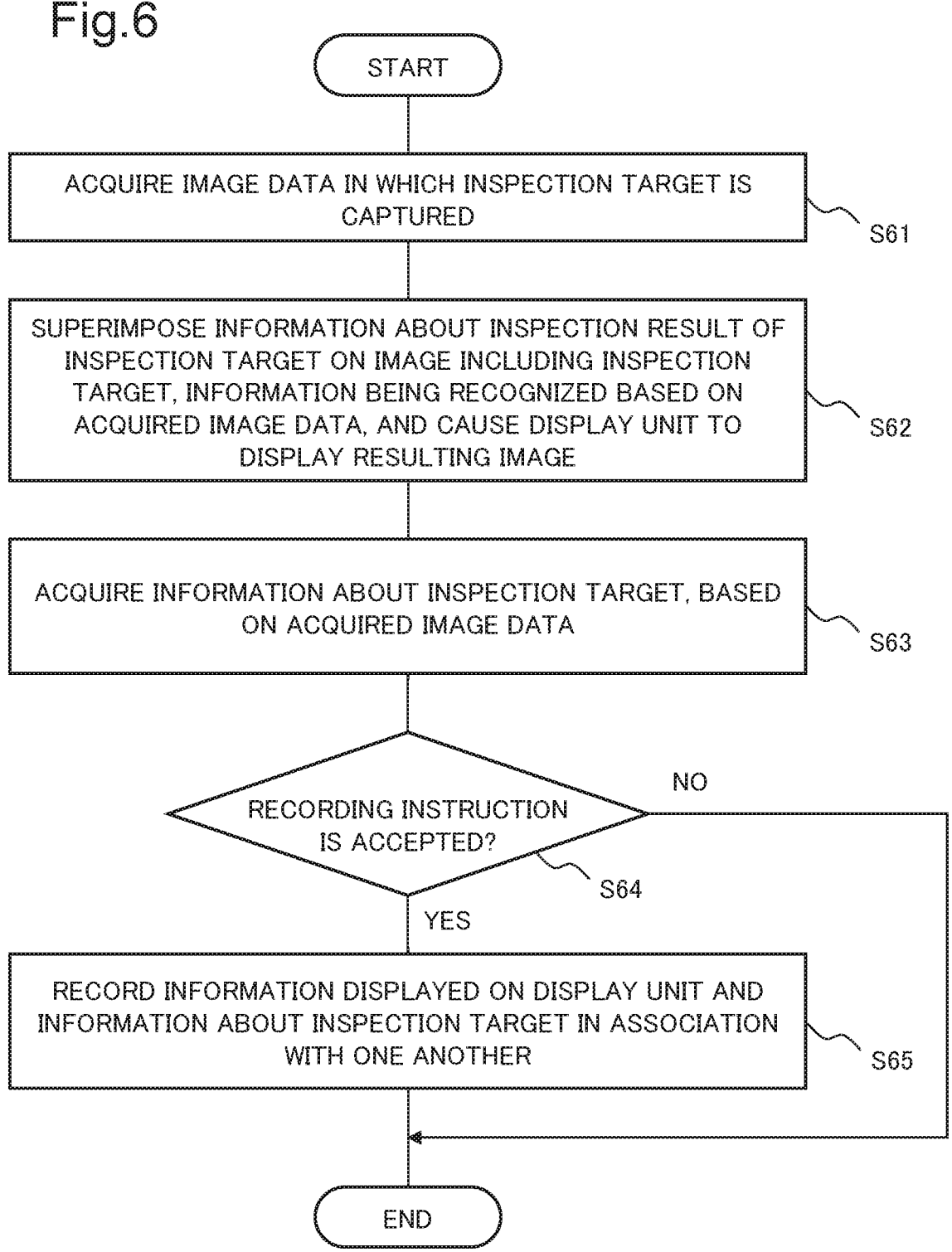
FIG. 6 is a flowchart illustrating an example of a processing flow in the inspection assistance device according to the second example embodiment.

FIG. 6 is a flowchart illustrating an example of a processing flow in the inspection assistance device 100 according to the present example embodiment. As described in FIG. 6, the image data acquisition unit 110 acquires image data in which an inspection target 3 is captured (Step S61). Then, the display control unit 120 superimposes information about an inspection result of the inspection target 3 on an image including the inspection target 3, the information being recognized based on the acquired image data, and causes the display unit 160 to display the resulting image (Step S62).

Further, the inspection target information acquisition unit 150 acquires information about the inspection target 3, based on the acquired image data (Step S63). Step S62 and Step S63 may be performed simultaneously or may be performed in reverse order.

Next, the acceptance unit 140 checks whether a recording instruction is accepted (Step S64). When the worker 2 checking the information displayed on the display unit 160 inputs a recording instruction by use of the input device 200, the acceptance unit 140 accepts the recording instruction (YES in Step S64). When the acceptance unit 140 accepts the recording instruction, the recording control unit 130 records the information displayed on the display unit 160 and the information about the inspection target 3 in association with one another (Step S65). When the acceptance unit 140 does not accept a recording instruction (NO in Step S64), the inspection assistance device 100 ends the processing. For example, the acceptance unit 140 may determine that a recording instruction is not accepted when a recording instruction is not accepted for a predetermined time after the display unit 160 displays the information about the inspection result.

Further, the acceptance unit 140 may be configured to accept an instruction not to record. In this case, the recording control unit 130 may record the information displayed on the display unit 160 and the information about the inspection target 3 in association with one another when the acceptance unit 140 does not accept an instruction not to record. With such a configuration, even when there are many pieces of information to be recorded, the worker 2 can readily sort out information not necessary to be recorded.

Further, when the acceptance unit 140 does not accept a recording instruction for a predetermined time or the recording unit 140 accepts an instruction not to record, the image data acquisition unit 110 may acquire new image data different from the image data acquired in Step S61. Then, the display control unit 120 may recognize information about an inspection result related to an inspection target 3 from the new image data. When the acceptance unit 140 performs as described above, the display control unit 120 may perform the recognition processing again by use of image data identical to the image data used for recognition in Step S62. At this time, the display control unit 120 may perform the recognition processing on a condition identical to that used in Step S62 (for example, the same recognition parameter) or may perform the recognition processing on a different condition. Alternatively, the display control unit 120 may perform predetermined correction processing on the image data and perform the recognition processing. Further, when the acceptance unit 140 performs as described above, for example, the image data acquisition unit 110 may acquire new image data when a result of performing recognition again by use of the same image data by the display control unit 120 is identical to the previously recognized result.

Further, the acceptance unit 140 may be configured to accept a re-recognition instruction by the worker 2. For example, when the worker 2 checks information displayed on the display unit 160, determines that the displayed information has an error, and inputs a re-recognition instruction to perform re-recognition, the acceptance unit 140 accepts the re-recognition instruction. When the acceptance unit 140 accepts a re-recognition instruction, the image data acquisition unit 110 may acquire new image data different from the image data acquired in Step S61. Then, the display control unit 120 may recognize information about an inspection result related to an inspection target 3 from the new image data. When the acceptance unit 140 accepts a re-recognition instruction, the display control unit 120 may perform the recognition processing again by use of image data identical to the image data used for recognition in Step S62. At this time, the display control unit 120 may perform the recognition processing on a condition identical to that used in Step S62 or may perform the recognition processing on a different condition. Alternatively, the display control unit 120 may perform predetermined correction processing on the image data and perform the recognition processing. Further, when the acceptance unit 140 accepts a re-recognition instruction, for example, the image data acquisition unit 110 may acquire new image data when a result of performing recognition again by use of the same image data by the display control unit 120 is identical to the previously recognized result.

Figure 7:
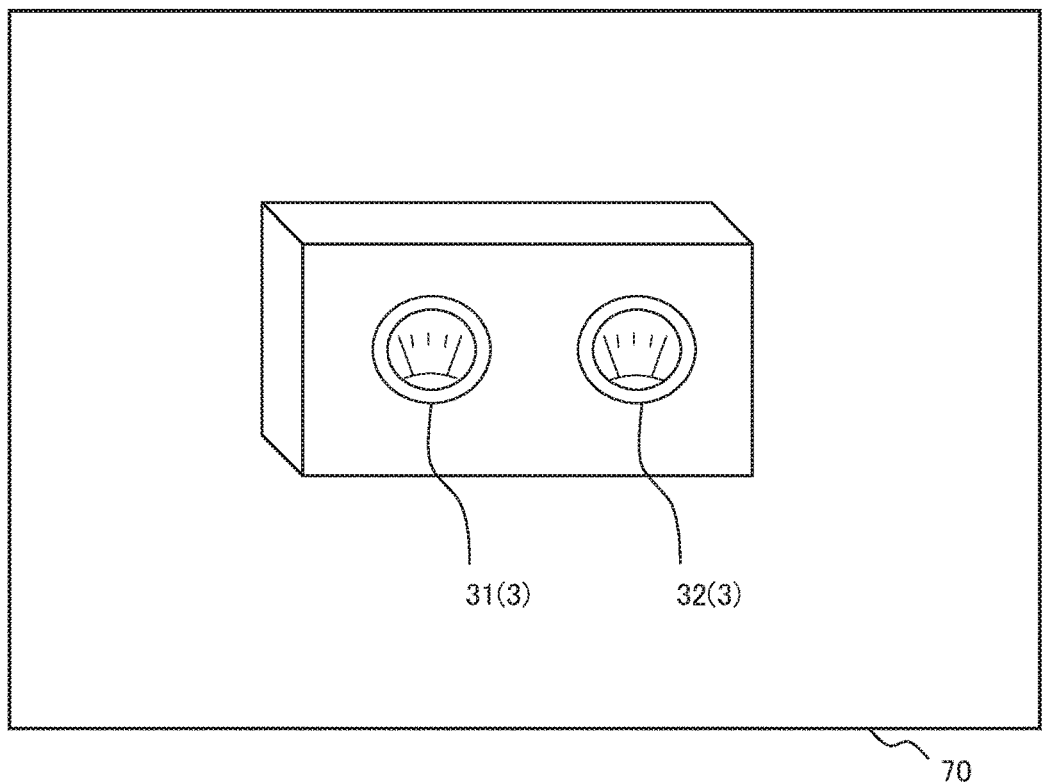
FIG. 7 is a diagram illustrating an example of an image represented by image data acquired by an image data acquisition unit.

FIG. 7 illustrates an example of an image represented by image data acquired by the image data acquisition unit 110. As illustrated in FIG. 7, the image 70 represented by image data acquired by the image data acquisition unit 110 includes an inspection target 3. It is assumed in the description of the example illustrated in FIG. 7 that the inspection target 3 is composed of two thermometers (a thermometer 31 and a thermometer 32). The inspection target 3 may be an entire measuring instrument including the thermometer 31 and the thermometer 32.

Figure 8:
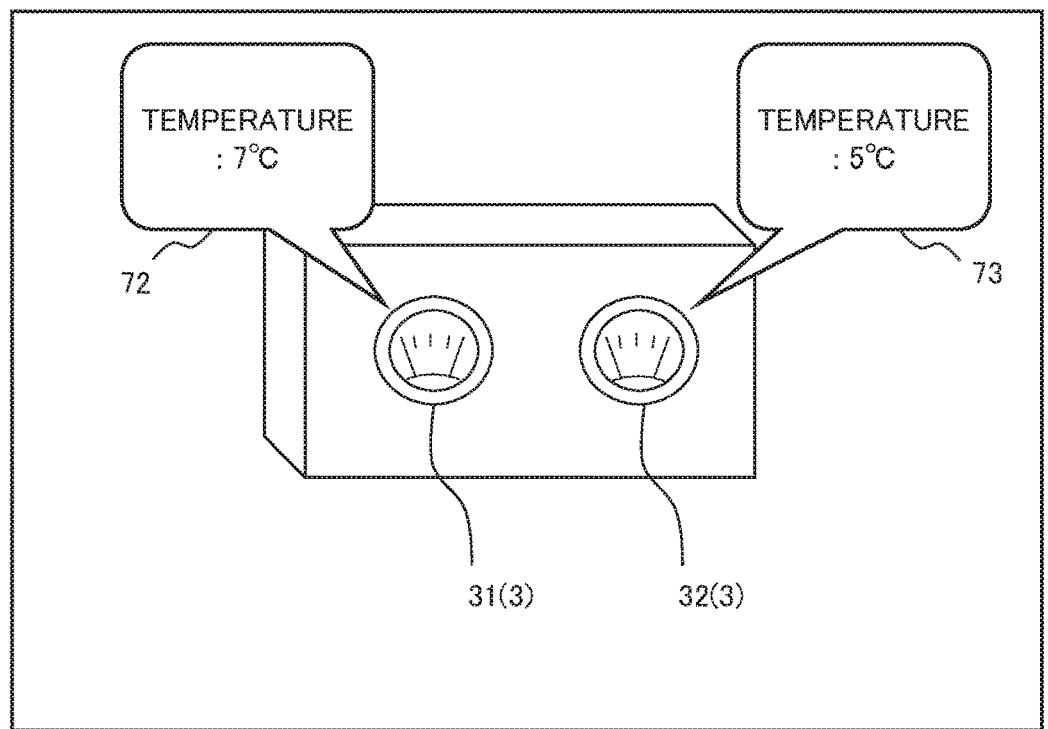
FIG. 8 is a diagram illustrating an example of a display screen displayed by a display unit.

FIG. 8 is a diagram illustrating an example of a display screen 71 displayed by the display unit 160. As illustrated in FIG. 8, the display screen 71 is displaying pieces of information, that is, measured temperature information 72 being information about an inspection result of the thermometer 31 constituting the inspection target 3 and measured temperature information 73 being information about an inspection result of the thermometer 32 constituting the inspection target 3. The pieces of information is superimposed on the image 70 illustrated in FIG. 7, displayed on the display unit 160. The display control unit 120 may identify an entire measuring instrument including the thermometer 31 and the thermometer 32, subsequently identify that the inspection target 3 related to the measuring instrument is composed of the thermometer 31 and the thermometer 32, and recognize a measured temperature of the thermometer 31 and a measured temperature of the thermometer 32. Then, the display control unit 120 may generate the display screen 71 acquired by superimposing the measured temperature information 72 indicating the measured temperature of the thermometer 31 and the measured temperature information 73 indicating the measured temperature of the thermometer 32 on the image 70. Positions where the recording control unit 130 displays the measured temperature information 72 and the measured temperature information 73 are not particularly limited and may be arbitrary positions.

The worker 2 wearing the wearable glasses 4 can readily grasp information about an inspection result of the inspection target 3 by checking the display screen 71 displayed on the display unit 160 on the wearable glasses 4.

Figures 9, 10:
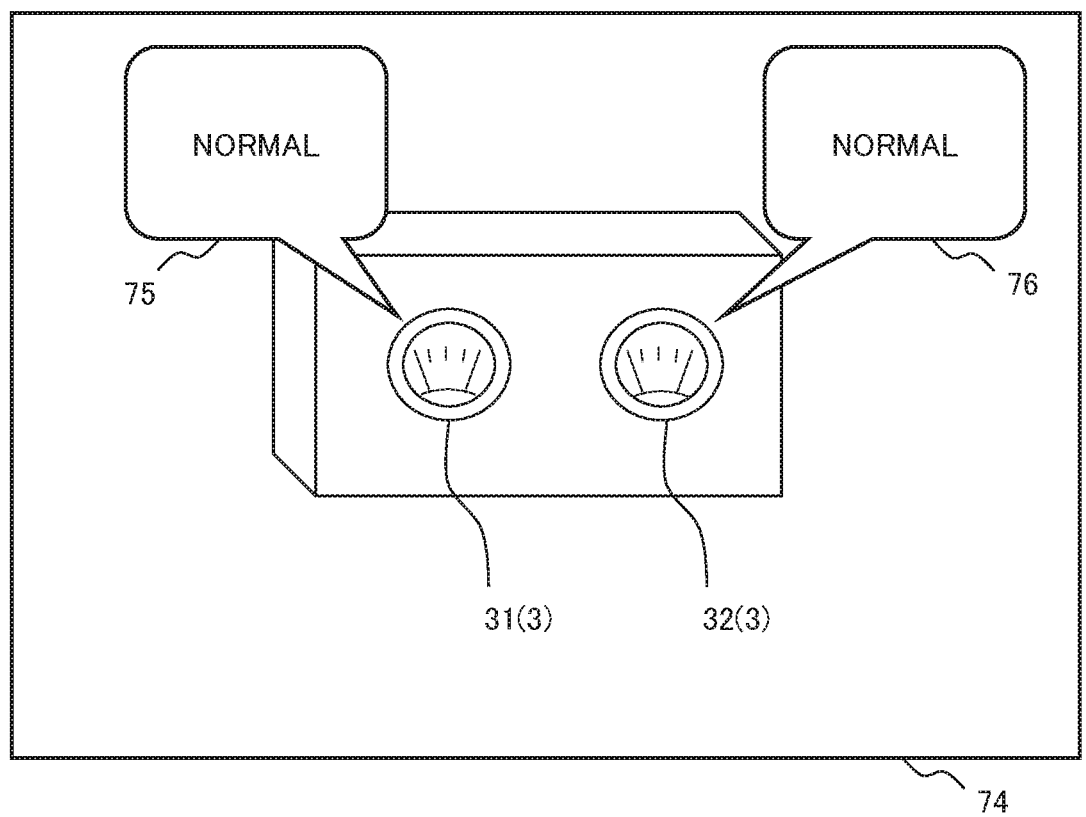
FIG. 9 is a diagram illustrating an example of recorded information recorded in a recording unit.
FIG. 10 is a diagram illustrating another example of a display screen displayed by the display unit.

Next, information recorded in the recording unit 170 will be described with reference to FIG. 9. FIG. 9 is a diagram illustrating an example of recorded information 91 recorded in the recording unit 170. The recorded information 91 includes information displayed on the display unit 160 and information about an inspection target 3 associated with one another by the recording control unit 130. It is assumed in the example illustrated in FIG. 9 that the information displayed on the display unit 160 is a measured value 92. Measured values 92 illustrated in FIG. 9 are a measured temperature indicated by the measured temperature information 72 and a measured temperature indicated by the measured temperature information 73 that are illustrated in FIG. 8. The pieces of information displayed on the display unit 160 may be the measured temperature information 72 itself and the measured temperature information 73 itself illustrated in FIG. 8. For example, "TEMPERATURE: 7° C." illustrated in FIG. 8 may be included in a measured value 92 column. Further, it is assumed in this example that the information about an inspection target 3 includes an inspection target name 93 indicating a name of the inspection target 3 and an inspection item 94 for the inspection target 3. As illustrated in FIG. 9, it is assumed that inspection target names 93 of the thermometer 31 constituting the inspection target 3 are "THERMOMETER 31" and "THERMOMETER 32." Then, it is assumed that an inspection item 94 for each of the thermometer 31 and the thermometer 32 is "MEASURE TEMPERATURE." As illustrated in FIG. 9, the recorded information 91 records a measured value 92, and an inspection target name 93 and an inspection item 94 in association with one another.

The recording control unit 130 may associate data represented in the display screen 71 displayed on the display unit 160 with the information about the inspection target 3, as the pieces of information displayed on the display unit 160. Further, the recording control unit 130 may record the image 70 in further association with the information about the inspection target 3. At this time, for example, the recording control unit 130 may extract an image of the thermometer 31 part included in the image 70 and associate the image of the thermometer 31 part with the information about the thermometer 31.

Further, the recording control unit 130 may record information indicating a recording instruction accepted by the acceptance unit 140 in a further associated manner into the recording unit 170. Information indicating a recording instruction may be a flag indicating completion of checking or information indicating whether or not a displayed content is correct. Further, for example, when a recording instruction accepted by the acceptance unit 140 indicates the thermometer 31, the recording control unit 130 may extract an image of the thermometer 31 part included in the image 70 and associate the image of the thermometer 31 part with the information about the thermometer 31.

Further, when the input device 200 is a sound collecting device such as a microphone, the acceptance unit 140 may accept collected voice data. The recording control unit 130 may determine the acceptance unit 140 accepting voice data to be a recording instruction. Further, the recording control unit 130 may analyze voice data accepted by the acceptance unit 140 and when voice indicating a recording instruction is included, may record the information displayed on the display unit 160 and the information about the inspection target 3 in association with one another. Further, the recording control unit 130 may record collected voice data in association with the information displayed on the display unit 160.

Further, the input device 200 may detect a worker's action indicating that the worker 2 performs a predetermined action and provide action information indicating the detected action for the acceptance unit 140. Then, the acceptance unit 140 may accept the action information. The action information may indicate the predetermined action or may indicate an action reacting to contents in the display screen 71. The recording control unit 130 may determine acceptance of the action information by the acceptance unit 140 to be a recording instruction. Further, the recording control unit 130 may recognize an action included in the action information accepted by the acceptance unit 140, by, for example, comparing the action with a dictionary, and when the action indicating the recording instruction is included in the action information, may record the pieces of information displayed on the display unit 160 and the information about the inspection target 3 in association with one another. Further, the recording control unit 130 may record action information in association with the pieces of information displayed on the display unit 160.

Further, for example, information about an inspection target includes an inspection item for the inspection target, a normal value of the inspection target, and information indicating a state of the inspection target in a normal condition but is not limited to the above.

While the display screen 71 illustrated in FIG. 8 includes the measured temperature information 72 being a measured value with respect to the thermometer 31 and the measured temperature information 73 being a measured value with respect to the thermometer 32 as information about an inspection result, information about an inspection result is not limited to a measured value. FIG. 10 is a diagram illustrating an example of a display screen 74 displayed by the display unit 160. The display screen 74 illustrated in FIG. 10 displays information (75, 76) indicating whether or not an inspection result is normal as information about an inspection result. When an inspection target 3 is composed of a thermometer 31 and a thermometer 32 as illustrated in FIG. 10, the information (75, 76) indicating whether or not an inspection result is normal is a result determining whether or not temperature is within a predetermined range.

Figure 11:
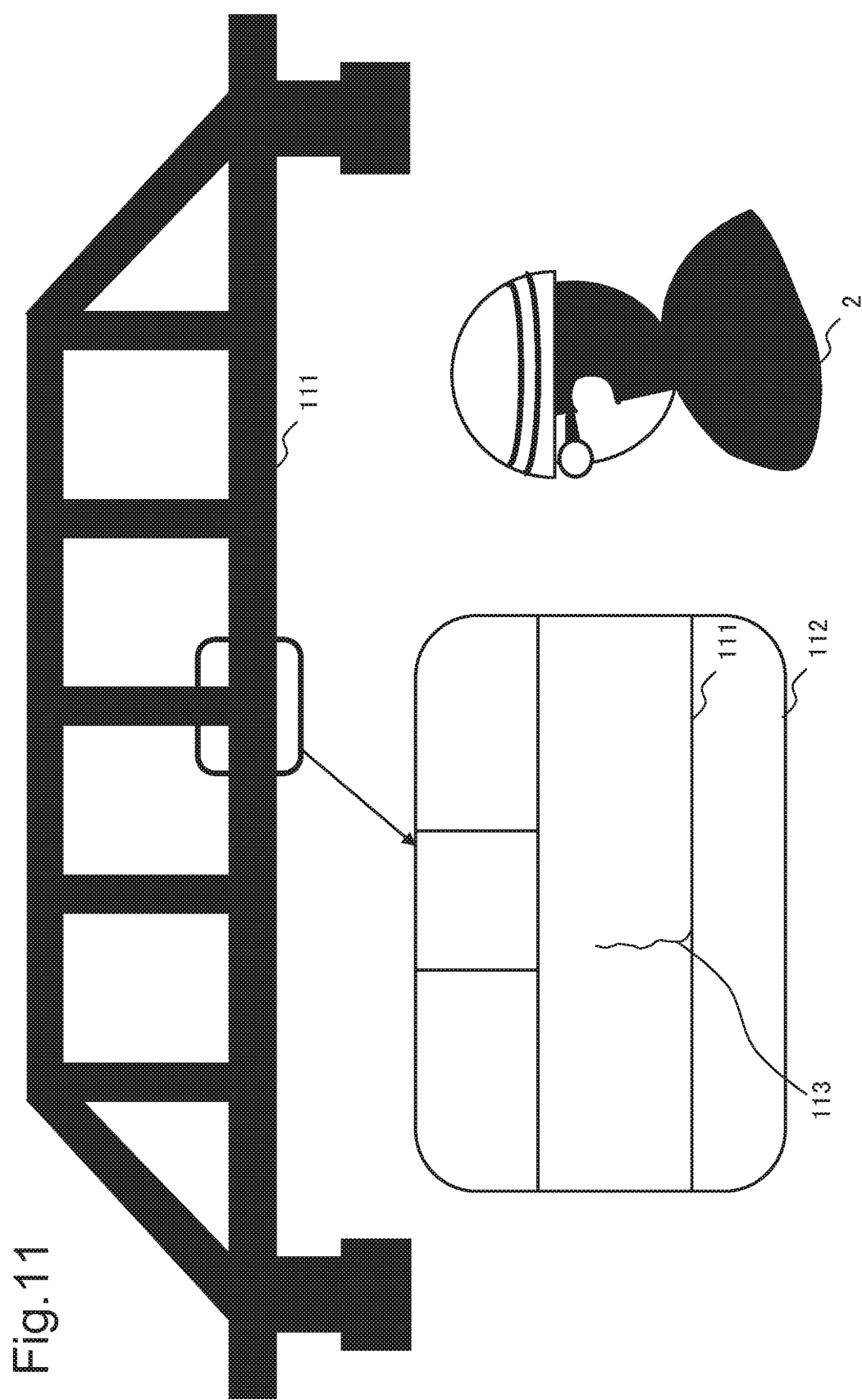
FIG. 11 is a diagram illustrating another example of an image represented by image data acquired by the image data acquisition unit.

Further, an inspection target 3 is not limited to a measuring instrument. FIG. 11 is a diagram illustrating another example of an image represented by image data acquired by the image data acquisition unit 110. When the worker 2 photographs part of a bridge 111 as an inspection target 3, an image 112 represented by image data acquired by the image data acquisition unit 110 includes the part of the bridge 111 as the inspection target 3, as illustrated in FIG. 11. Thus, an inspection target may be a structure instead of a measuring instrument. It is assumed that the bridge 111 has a crack 113.

Figure 12:
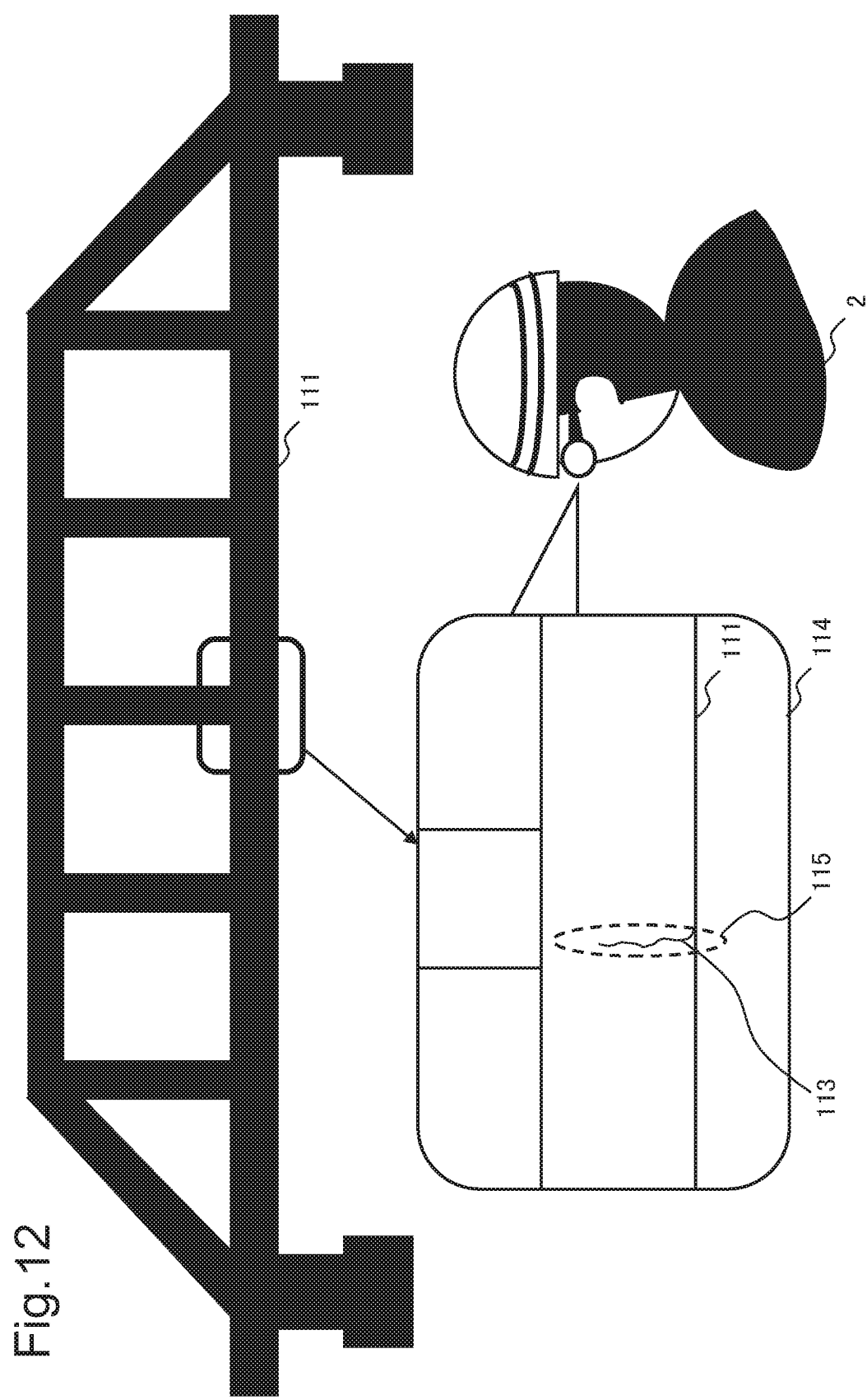
FIG. 12 is a diagram illustrating another example of a display screen displayed by the display unit.

FIG. 12 is a diagram illustrating an example of a display screen 114 displayed by the display unit 160. It is assumed in this example that the display control unit 120 detects the crack 113 by comparison with a previously photographed image of the bridge 111 or an image displaying the crack 113. In this case, as illustrated in FIG. 12, the display unit 160 displays the display screen 114 displaying a mark (an ellipse 115 in the example in FIG. 12) for grasping a position of the crack 113, the mark being superimposed on the image 112 illustrated in FIG. 11, as information about an inspection result of the bridge 111. Thus, the recording control unit 130 may make a degraded spot of a structure displayed as information about an inspection result in a graspable manner for the worker 2. A display method of a degraded spot of a structure is not limited to the ellipse 115; and for example, the spot of the crack 113 may be displayed in a color different from other colors, or another method may be employed.

Figure 13:
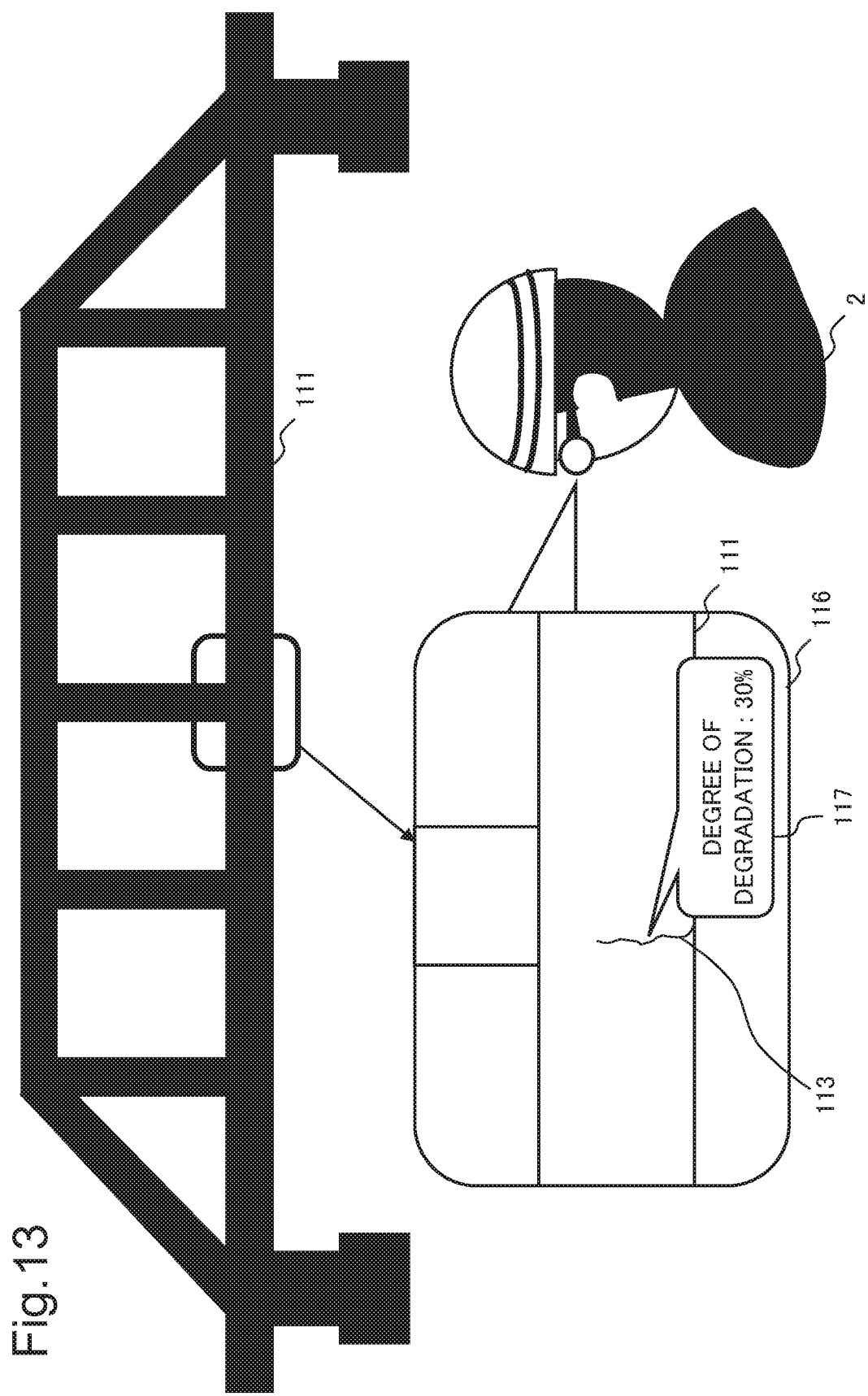
FIG. 13 is a diagram illustrating another example of a display screen displayed by the display unit.

FIG. 13 is a diagram illustrating an example of a display screen 116 displayed by the display unit 160. The display screen 116 illustrated in FIG. 13 displays information 117 indicating a degree of degradation as information about an inspection result. In this case, the display control unit 120 may include the information 117 indicating a degree of degradation in the display screen 116 by recognizing the crack 113 from image data and calculating the degree of degradation of the crack 113 by a predetermined method.

As described above, in the inspection assistance device 100 according to the present example embodiment, the image data acquisition unit 110 acquires image data in which an inspection target is captured, and the display control unit 120 superimposes information about an inspection result of the inspection target on an image including the inspection target, the information being recognized based on the acquired image data, and cause the display unit to display the resulting image.

Thus, the inspection assistance device 100 according to the present example embodiment can superimpose information about an inspection result on an image represented by the image data, the information being recognized based on image data in which an inspection target is captured, and cause the display unit 160 on the wearable glasses 4 to display the resulting image. Since the image represented by the image data includes the inspection target, the worker 2 wearing the wearable glasses 4 can grasp the inspection target and the information about the inspection result of the inspection target.

Further, the recording control unit 130 in the inspection assistance device 100 records information about an inspection result, the information being displayed on the display unit 160, and information about an inspection target in association with one another. For example, when information about an inspection target is an inspection item, the recording control unit 130 records the inspection item and information about an inspection result in association with one another. Consequently, for example, time and effort for manually inputting information about an inspection result by use of a terminal or the like by the worker 2 can be saved. Further, human errors due to manual input can be reduced. At this time, it is preferable that the recording control unit 130 record information about an inspection result and information about an inspection target when the acceptance unit 140 accepts a recording instruction. Consequently, only information necessary in inspection work is recorded, and therefore management efficiency of recorded information can be enhanced.

Further, by referring to recorded information, a worker checking an inspection result can readily grasp an inspection item and information about the inspection result. As described above, the inspection assistance device 100 according to the present example embodiment can enhance efficiency of inspection work.

Third Example Embodiment

A configuration of the inspection target information acquisition unit 150 acquiring information about an inspection target, based on image data, has been described, according to the aforementioned second example embodiment; however, the present disclosure is not limited to the above.

Another example of acquisition of information about an inspection target, according to the present example embodiment, will be described. A block having a function similar to a block described in the aforementioned second example embodiment is given the same sign.

Figure 14:
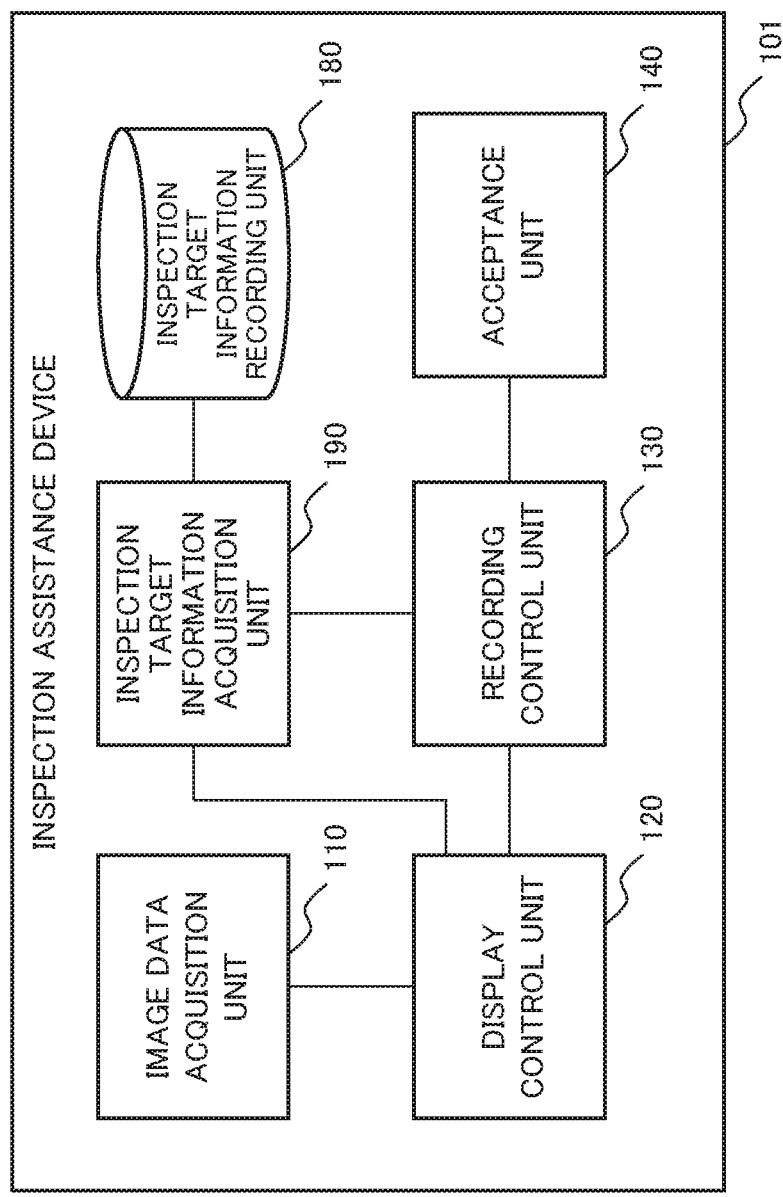
FIG. 14 is a block diagram illustrating a configuration example of an inspection assistance device according to a third example embodiment.

FIG. 14 is a block diagram illustrating a configuration example of an inspection assistance device 101 according to the present example embodiment. The inspection assistance device 101 is equipped on wearable glasses 4, similarly to the inspection assistance device 100.

The inspection assistance device 101 includes an image data acquisition unit 110, a display control unit 120, a recording control unit 130, an acceptance unit 140, an inspection target information recording unit 180, and an inspection target information acquisition unit 190. The inspection assistance device 101 is configured to include the inspection target information acquisition unit 190 in place of the inspection target information acquisition unit 150 in the inspection assistance device 100 and further include the inspection target information recording unit 180.

The inspection target information recording unit 180 records inspection target information. FIG. 15 illustrates an example of inspection target information recorded by the inspection target information recording unit 180. Inspection target information 151 includes information about an inspection target 3. It is assumed that the information about the inspection target 3 includes an inspection target name 153 and an inspection item 154, similarly to the aforementioned second example embodiment. Further, the inspection target information 151 includes an inspection target position 152 indicating a position of the inspection target 3. A notation method of the inspection target position 152 is not particularly limited, and the inspection target position 152 has only to be information telling a position.

The inspection target information recording unit 180 may be provided by a recording device separate from the inspection assistance device 101.

The inspection target information acquisition unit 190 acquires information about an inspection target, based on positional information at the time of capturing image data. The inspection target information acquisition unit 190 acquires positional information at the time of capturing image data, through the display control unit 120. The positional information at the time of capturing image data may be information indicating a position of the wearable glasses 4 photographing the image data or may be information indicating a position of an inspection target 3 included in the acquired image data, the position being estimated from the image data.

With regard to a position of the wearable glasses 4 acquiring image data, for example, the wearable glasses 4 may receive positional information by use of the Global Positioning System (GPS) and attach the positional information to the image data. Then, the inspection target information acquisition unit 190 compares the positional information attached to the image data with an inspection target position 152 in the inspection target information 151 stored in the inspection target information recording unit 180. The inspection target information acquisition unit 190 acquires, from the inspection target information recording unit 180, information about an inspection target 3 associated with an inspection target position 152 within a predetermined range from a position indicated by the positional information attached to the image data. In the example illustrated in FIG. 15, the inspection target information acquisition unit 190 acquires, from the inspection target information recording unit 180, an inspection target name 153 and an inspection item 154 that are associated with an inspection target position 152 within a predetermined range from a position indicated by the positional information attached to the image data.

Then, the recording control unit 130 records the information about an inspection result, the information being displayed on the display unit 160, and the information about the inspection target, the information being acquired by the inspection target information acquisition unit 190, in association with one another, similarly to the recording control unit 130 according to the aforementioned second example embodiment.

In the inspection assistance device 101 according to the present example embodiment, the inspection target information acquisition unit 190 acquires information about an inspection target, based on positional information at the time of capturing image data. Consequently, for example, even when inspection targets having the same shape exist at a plurality of positions, information about an inspection target included in the image data can be identified. Consequently, the recording control unit 130 can suitably associate information about an inspection result with respect to the inspection target included in the image data with the information about the inspection target. Accordingly, by referring to recorded information, a worker checking an inspection result can readily grasp an inspection item and information about an inspection result. As described above, the inspection assistance device 101 according to the present example embodiment can enhance efficiency of inspection work.

Modified Example

Inspection target information recorded by the inspection target information recording unit 180 is not limited to the form in FIG. 15. In this modified example, another example of inspection target information recorded by the inspection target information recording unit 180 will be described. FIG. 16 is a diagram illustrating another example of inspection target information recorded by the inspection target information recording unit 180. Inspection target information 161 includes information about an inspection target 3. It is assumed that information about an inspection target 3 includes an inspection target name 163 and an inspection item 164, similarly to the inspection target information 151. Further, the inspection target information 161 includes an inspection time 162 indicating a time when the inspection target 3 is inspected. A notation method of the inspection time 162 is not particularly limited, and the inspection time 162 has only to be information telling a time.

The inspection target information acquisition unit 190 acquires information about an inspection target, based on time information at the time of capturing image data. The inspection target information acquisition unit 190 acquires time information at the time of capturing image data through the display control unit 120. Time information at the time of capturing image data is information indicating a time when the image data are photographed. Time information at the time of photographing image data may be attached to the image data.

The inspection target information acquisition unit 190 compares time information at the time of photographing image data with an inspection time 162 in the inspection target information 161 stored in the inspection target information recording unit 180. The inspection target information acquisition unit 190 acquires, from the inspection target information recording unit 180, information about an inspection target 3 associated with an inspection time 162 within a predetermined period from a time indicated by the time information at the time of photographing the image data. In the example illustrated in FIG. 16, the inspection target information acquisition unit 190 acquires, from the inspection target information recording unit 180, an inspection target name 163 and an inspection item 164 that are associated with an inspection time 162 within the predetermined period from a time indicated by the time information at the time of photographing the image data.

Then, the recording control unit 130 records information about an inspection result displayed on the display unit 160 and the information about the inspection target, the information being acquired by the inspection target information acquisition unit 190, in association with one another, similarly to the recording control unit 130 according to the aforementioned second example embodiment.

In the inspection assistance device 101 according to this modified example, the inspection target information acquisition unit 190 acquires information about an inspection target, based on time information at the time of capturing image data. Consequently, for example, when an inspection target to be inspected varies depending on a time, information about an inspection target included in image data can be identified by comparing time information. Consequently, the inspection target information acquisition unit 190 can readily acquire information about an inspection target. Further, for example, even when inspection targets having the same shape exist at a plurality of positions, the inspection target information acquisition unit 190 can identify information about an inspection target included in image data as long as each inspection time is different.

Thus, the inspection assistance device 101 according to this modified example can enhance efficiency of inspection work, similarly to the inspection assistance device 101 according to the aforementioned third example embodiment.

For example, the inspection target information acquisition unit 190 in the inspection assistance device 101 may acquire information about an inspection target by use of an RFID. For example, the inspection target information acquisition unit 190 may read an RFID tag attached to an inspection target included in image data and identify the inspection target, based on the read data. Then, the inspection target information acquisition unit 190 may acquire information about the identified inspection target from the inspection target information recording unit 180. Thus, even with a configuration using an RFID, the inspection assistance device 101 can acquire information about an inspection target.

Hardware Configuration

Figure 17:
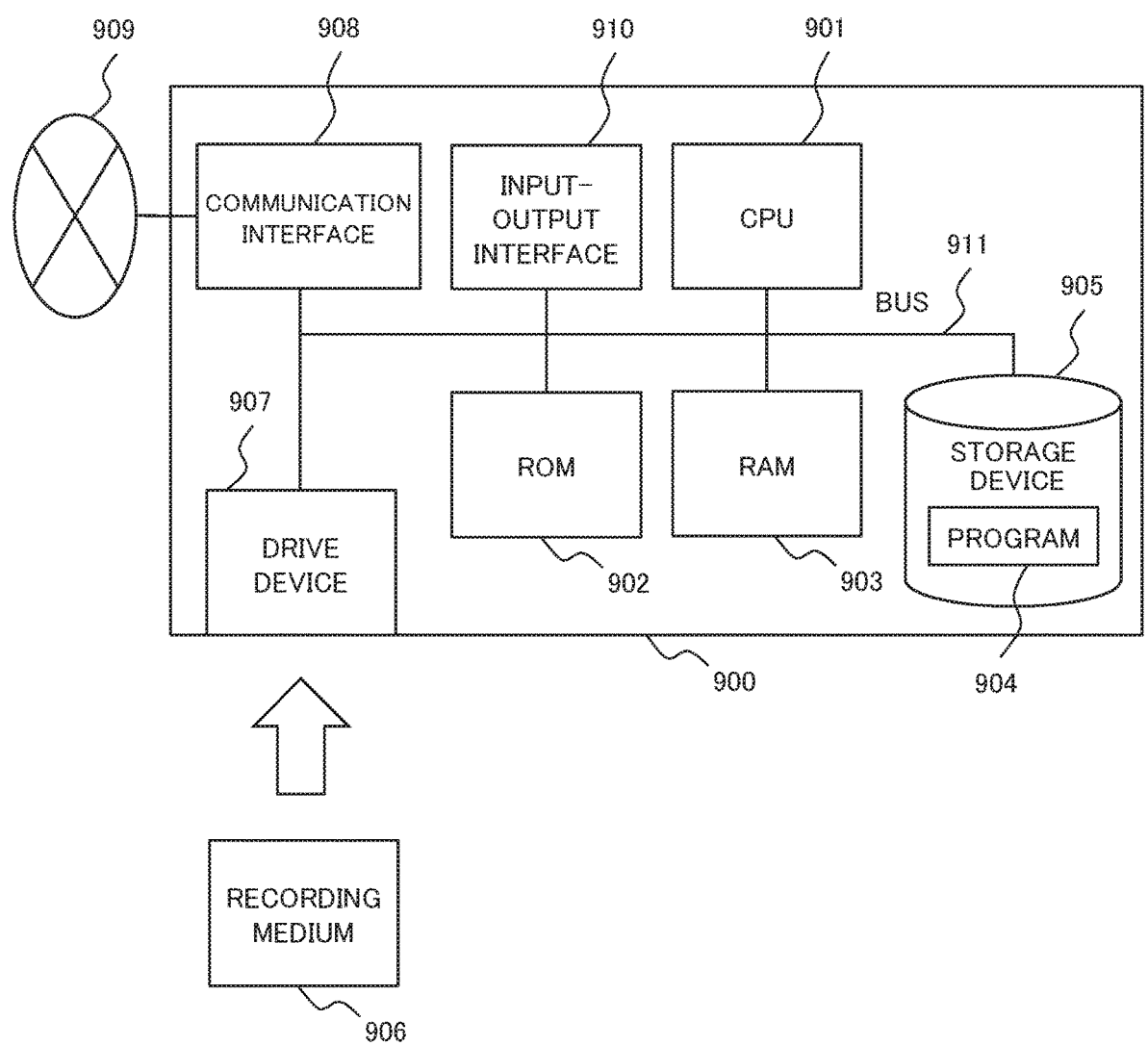
FIG. 17 is a diagram exemplarily illustrating a hardware configuration of a computer (information processing device) capable of providing each example embodiment.

Each component in the inspection assistance device (10, 100, 101) according to the respective example embodiments of the present disclosure represents a function-based block. For example, a part or the whole of each component in the inspection assistance device (10, 100, 101) is provided by an arbitrary combination of an information processing device 900 and a program as illustrated in FIG. 17. FIG. 17 is a block diagram illustrating an example of a hardware configuration of the information processing device 900 providing each component in the inspection assistance device (10, 100, 101). An example of the information processing device 900 includes the following configuration.

A central processing unit (CPU) 901
A read only memory (ROM) 902
A random access memory (RAM) 903
A program 904 loaded on the RAM 903
A storage device 905 storing the program 904
A drive device 907 for reading and writing of a recording medium 906
A communication interface 908 connected to a communication network 909
An input-output interface 910 inputting and outputting data
A bus 911 connecting each component Each component in the inspection assistance device (10, 100, 101) according to the respective example embodiments is provided by the CPU 901 acquiring and executing the program 904 providing the functions of the component. For example, the program 904 providing the function of each component in the inspection assistance device (10, 100, 101) is previously stored in the storage device 905 or the ROM 902, and is read by the CPU 901 as needed. The program 904 may be provided for the CPU 901 through the communication network 909, or may be previously stored in the recording medium 906, be read by the drive device 907, and be provided for the CPU 901.

There are various modified examples for a method of providing the inspection assistance device (10, 100, 101). For example, the inspection assistance device (10, 100, 101) may be provided by an arbitrary combination of an information processing device 900 and a program, the combination being separate for each component. Further, a plurality of components included in the inspection assistance device (10, 100, 101) may be provided by an arbitrary combination of a single information processing device 900 and a program.

Further, a part or the whole of each component in the inspection assistance device (10, 100, 101) is provided by another general-purpose or dedicated circuit, a processor, or the like, or a combination thereof. The above may be configured with a single chip or may be configured with a plurality of chips connected through a bus.

A part or the whole of each component in the inspection assistance device (10, 100, 101) may be provided by a combination of the aforementioned circuit or the like, and a program.

When a part or the whole of each component in the inspection assistance device (10, 100, 101) is provided by a plurality of information processing devices, circuits, or the like, the plurality of information processing devices, circuits, or the like may be arranged in a concentrated manner or be arranged in a distributed manner. For example, the respective information processing devices, circuits, or the like may be provided in a form of being connected with one another through a communication network, such as a client-server system, a cloud computing system, or the like.

The respective aforementioned example embodiments are preferred example embodiments of the present disclosure, and the scope of the present disclosure is not limited to the respective aforementioned example embodiments; and a person skilled in the art may make example embodiments which include various changes through modifying and substituting the respective aforementioned example embodiments without departing from the spirit and scope of the present disclosure.

REFERENCE SIGNS LIST

1 Wearable glasses
2 Worker
3 Inspection target
4 Wearable glasses
10 Inspection assistance device
11 Image data acquisition unit 12 Display control unit
13 Recording control unit
14 Display unit
100 Inspection assistance device
101 Inspection assistance device
110 Image data acquisition unit
120 Display control unit
130 Recording control unit
140 Acceptance unit
150 Inspection target information acquisition unit
160 Display unit
170 Recording unit
180 Inspection target information recording unit
190 Inspection target information acquisition unit
200 Input device

The invention claimed is:

1. An inspection assistance device comprising:
one or more memories storing instructions; and
one or more processors connected to the one or more memories and configured to execute the instructions to:
acquire image data in which an inspection target is captured;
recognize, based on the acquired image data, information about an inspection result of the inspection target based on a predetermined recognition condition;
superimpose the recognized information on an image including the inspection target, and cause a display to display a resulting image;
record the information displayed on the display and information about the inspection target in association with each other;
perform a first re-recognizing process to re-recognize the information about the inspection result based on the acquired image data when accepting a first re-recognition instruction; and
perform a second re-recognizing process to re-recognize the information about the inspection result based on a recognition condition different from the predetermined recognition condition when a result of the first re-recognizing process and a result of recognizing before the first re-recognizing process are the same and when accepting a second re-recognition instruction.

2. The inspection assistance device according to claim 1, wherein the one or more processors are configured to execute the instructions to acquire information about the inspection target, based on the acquired image data.

3. The inspection assistance device according to claim 1, wherein the one or more processors are configured to execute the instructions to acquire information about the inspection target, based on positional information at a time of capturing the image data.

4. The inspection assistance device according to claim 1, wherein the one or more processors are configured to execute the instructions to acquire information about the inspection target, based on time information at a time of capturing the image data.

5. The inspection assistance device according to claim 1, wherein the one or more processors are configured to execute the instructions to, when not accepting an instruction not to record, record the information displayed on the display and information about the inspection target in association with each other.

6. The inspection assistance device according to claim 1, wherein the one or more processors are configured to execute the instructions to,
when accepting the first re-recognition instruction, re-recognize information about the inspection result, based on image data different from the image data.

7. The inspection assistance device according to claim 1, wherein,
when the re-recognized inspection result and an inspection result recognized before the re-recognition are identical, information about the inspection result is re-recognized based on image data different from the image data.

8. An inspection assistance method comprising:
acquiring image data in which an inspection target is captured;
recognizing, based on the acquired image data, information about an inspection result of the inspection target based on a predetermined recognition condition;
superimposing the recognized information on an image including the inspection target, and causing a display to display a resulting image;
recording the displayed information and information about the inspection target in association with each other;
when accepting a first re-recognition instruction, performing a first re-recognizing process comprising re-recognizing the information about the inspection result based on the acquired image data; and
when a result of the first re-recognizing process and a result of recognizing before the first re-recognizing process are the same and when accepting a second re-recognition instruction, performing a second re-recognizing process comprising re-recognizing the information about the inspection result based on a recognition condition different from the predetermined recognition condition.

9. The inspection assistance method according to claim 8, further comprising,
when the re-recognized inspection result and an inspection result recognized before the re-recognition are identical, re-recognizing information about the inspection result, based on image data different from the image data.

10. A computer-readable non-transitory recording medium having a program recorded thereon, the program causing a computer to execute:
acquisition processing of acquiring image data in which an inspection target is captured;
recognition processing of recognizing, based on the acquired image data, information about an inspection result of the inspection target based on a predetermined recognition condition;
display processing of superimposing the recognized information about an inspection result of the inspection target on an image including the inspection target, the information being recognized based on the acquired image data, and causing a resulting image to be displayed;
recording processing of recording the displayed information and information about the inspection target in association with each other;
first re-recognition processing of re-recognizing the information about the inspection result based on the acquired image data when accepting a first re-recognition instruction; and
second re-recognition processing of re-recognizing the information about the inspection result based on a recognition condition different from the predetermined recognition condition when a result of the first re-recognition processing and a result of the recognition processing before the first re-recognition processing are the same and when accepting a second re-recognition instruction.

11. The recording medium according to claim 10, further causing a computer to execute re-recognition processing of, when the re-recognized inspection result and an inspection result recognized before the re-recognition are identical, re-recognizing information about the inspection result, based on image data different from the image data.

* * * * *